United States Patent
Soejima et al.

(10) Patent No.: US 6,491,358 B2
(45) Date of Patent: Dec. 10, 2002

(54) BRAKING FORCE CONTROL SYSTEM FOR VEHICLE

(75) Inventors: Yuji Soejima, Tokyo (JP); Tohru Akiyama, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/842,070

(22) Filed: Apr. 26, 2001

(65) Prior Publication Data

US 2001/0038242 A1 Nov. 8, 2001

(30) Foreign Application Priority Data

Apr. 26, 2000 (JP) .......................... 2000-126381
Apr. 26, 2000 (JP) .......................... 2000-126384

(51) Int. Cl.[7] ............. B60T 8/58; B60T 8/32
(52) U.S. Cl. ............. 303/146; 303/170; 303/189
(58) Field of Search ............. 303/146, 147, 303/148, 140, 170, 189

(56) References Cited

U.S. PATENT DOCUMENTS

| | | | |
|---|---|---|---|
| 4,593,955 A | | 6/1986 | Leiber |
| 4,755,945 A | * | 7/1988 | Kade et al. .............. 303/146 |
| 5,124,921 A | | 6/1992 | Jonner et al. |
| 5,185,704 A | * | 2/1993 | Okubo .............. 303/146 |
| 5,488,557 A | * | 1/1996 | Matsuda .............. 303/146 |

FOREIGN PATENT DOCUMENTS

| | | |
|---|---|---|
| JP | 10-119774 | 5/1988 |
| JP | 6-59821 | 8/1994 |
| JP | 09-099828 | 4/1997 |
| JP | 2801235 | 7/1998 |
| JP | 11-189149 | 7/1999 |

* cited by examiner

*Primary Examiner*—Matthew C. Graham
(74) *Attorney, Agent, or Firm*—Smith, Gambrell & Russell, LLP

(57) ABSTRACT

A braking force distribution control apparatus for a vehicle has a lateral acceleration detecting unit detecting lateral acceleration of the vehicle, a longitudinal acceleration detecting unit detecting longitudinal acceleration of the vehicle, a vehicle speed detecting unit detecting a vehicle speed, and a braking control unit adapted to select. When preset conditions for brake operating time are satisfied, the braking control unit executes one of select-low control and independent braking control in accordance with the lateral acceleration, the longitudinal acceleration and the vehicle speed, the select-low control controlling braking forces of left and right wheels depending on a wheel on the side with a large slipping condition. The independent braking control system independently controls the braking force for each wheel in dependency on the slipping condition of each of the wheels.

14 Claims, 5 Drawing Sheets

FIG. 3

| LATERAL ACCELERATION Gy / LONGITUDINAL ACCELERATION Gx | NOT HIGHER THAN 2.94m/s² | HIGHER THAN 2.94m/s² AND LOWER THAN 5.89m/s² | NOT HIGHER THAN 5.89m/s² |
|---|---|---|---|
| LOWER THAN 5.89m/s² | SELECT LOW CONTROL OF REAR WHEELS | SELECT LOW CONTROL OF REAR WHEELS / INDEPENDENT BRAKING CONTROL OF REAR WHEELS | INDEPENDENT BRAKING CONTROL OF REAR WHEELS / SELECT LOW CONTROL OF REAR WHEELS |
| HIGHER THAN 5.89m/s² | SELECT LOW CONTROL OF REAR WHEELS | SELECT LOW CONTROL OF REAR WHEELS / INDEPENDENT BRAKING CONTROL OF REAR WHEELS | INDEPENDENT BRAKING CONTROL OF REAR WHEELS / SELECT LOW CONTROL OF REAR WHEELS |

FIG. 5

| LATERAL ACCELERATION GY / LONGITUDINAL ACCELERATION GX | LOWER THAN 2.94m/s² | NOT LOWER THAN 2.94m/s² AND LOWER THAN 4.41m/s² | NOT LOWER THAN 4.41m/s² AND LOWER THAN 6.87m/s² | NOT LOWER THAN 6.87m/s² |
|---|---|---|---|---|
| LOWER THAN 6.87m/s² | · CONTROL OF FRONT WHEELS COMBINED WITH INDEPENDENT BRAKING CONTROL AND STEPWISE PRESSURE INCREASE CONTROL<br>· SELECT LOW CONTROL OF REAR WHEELS | · INDEPENDENT BRAKING CONTROL OF FRONT WHEELS<br>· INDEPENDENT BRAKING CONTROL OF REAR WHEELS | · INDEPENDENT BRAKING CONTROL OF FRONT WHEELS<br>· INDEPENDENT BRAKING CONTROL OF REAR WHEELS | · INDEPENDENT BRAKING CONTROL OF FRONT WHEELS<br>· CONTROL OF REAR WHEELS COMBINED WITH INDEPENDENT BRAKING CONTROL AND STEPWISE PRESSURE INCREASE CONTROL |
| NOT LOWER THAN 6.87m/s² | · INDEPENDENT BRAKING CONTROL OF FRONT WHEELS<br>· INDEPENDENT BRAKING CONTROL OF REAR WHEELS | · CONTROL OF FRONT WHEELS COMBINED WITH INDEPENDENT BRAKING CONTROL AND STEPWISE PRESSURE INCREASE CONTROL<br>· SELECT LOW CONTROL OF REAR WHEELS | · INDEPENDENT BRAKING CONTROL OF FRONT WHEELS<br>· INDEPENDENT BRAKING CONTROL OF REAR WHEELS | · INDEPENDENT BRAKING CONTROL OF FRONT WHEELS<br>· CONTROL OF REAR WHEELS COMBINED WITH INDEPENDENT BRAKING CONTROL AND STEPWISE PRESSURE INCREASE CONTROL |

BRAKING FORCE CONTROL SYSTEM FOR VEHICLE

BACKGROUND OF THE INVENTION

1. Field of the Invention

The present invention relates to a braking force control system of a vehicle which adequately distributes the braking force in braking.

2. Description of the Related Art

In recent years, there have been proposed various braking control systems which make use of constitutions of anti-lock braking systems (ABS) and control distribution of braking force in normal braking to be more adequate one.

For example, in JP-A-10-119744, there is disclosed one which, when deceleration of a vehicle reaches a specified value and a vehicle speed exceeds a specified speed, independently increases, reduces or holds braking oil pressure of each of right and left rear wheels so that braking force distribution between rear and front wheels becomes an approximately ideal one to perform independent braking control for carrying out sufficient braking.

During a braking operation, for example, road surface friction coefficients (road surface friction) with respect to left and right wheels are greatly asymmetric in some cases. Namely, when a wheel on one side of a vehicle is on a dry road surface (high friction road) and a wheel on the other side thereof is on, for example, an ice plate (low friction road), a very high yawing moment occurs in some cases when the vehicle is braked.

Therefore, in a related art ABS control operation, in order to prevent the stability of the vehicle from being lost by applying a large braking force to a wheel on the side of a high friction road, a select-low control, in which a brake on a high friction road side is controlled in accordance with a brake on a low friction road side, i.e., on the side of a large slipping condition, is employed in many cases.

In general, the above-described independent braking control is suitable for a case where the obtainment of a sufficient braking force is required, while the above-described select-low control is suitable for a case where the minimization of the occurrence of a yawing moment and the obtainment of a sufficient vehicle stability are required. Therefore, it is desired that these controls can be carried out in a suitably selected manner in accordance with the variously changing traveling condition of a vehicle.

Further, in a braking operation, also important is a method of generating a braking pressure for producing a braking force. Especially, when a braking pressure is rapidly increased on a split friction road or with a load on a vehicle greatly different at left and right parts thereof, and in other similar cases, a yawing moment occurs in the vehicle. This would cause the vehicle to become unstable, or an unpleasant rolling behavior to be left during the turning with a high lateral acceleration.

SUMMARY OF THE INVENTION

The present invention has been made in view of the above-mentioned circumstances, and provides a braking force distribution control apparatus for vehicles, capable of carrying out a reliable and stable braking operation finely and in a well-balanced manner by suitably selecting various braking controls in accordance with variously changing traveling condition of a vehicle, and executing a selected control, without adding a special complicated mechanism to the apparatus.

To attain the above object, according to a first aspect of the invention, there is provided a braking force distribution control apparatus for a vehicle, including: a lateral acceleration detecting unit detecting a lateral acceleration of the vehicle; a longitudinal acceleration detecting unit detecting a longitudinal acceleration of the vehicle; a vehicle speed detecting unit detecting a vehicle speed; and a braking control unit adapted to select and execute, one of a select-low control and an independent braking control in accordance with the lateral acceleration, the longitudinal acceleration and the vehicle speed when preset conditions for brake operating time are satisfied, the select-low control controlling braking forces of left and right wheels depending on a wheel on the side with a large slipping condition, the independent braking control independently controlling the braking force for each wheel depending on the slipping condition of each wheel.

In the braking force distribution control apparatus according to the first aspect, the lateral acceleration of a vehicle is detected by the lateral acceleration detecting unit, the longitudinal acceleration of the vehicle by the longitudinal acceleration detecting unit, and a vehicle speed by the vehicle speed detecting unit. The braking control device is adapted to select, when preset conditions for a braking operation are satisfied, either of a select-low control in which a wheel braking force for a left wheel and a right wheel is controlled in accordance with lateral acceleration, longitudinal acceleration and vehicle speed and correspondingly to a wheel on the side with a large slipping condition, and an independent braking control in which the braking force for each wheel is controlled independently and correspondingly to the slipping condition of each wheel, and then execute a selected control.

In addition, in the above braking force distribution control apparatus, when the preset conditions for a braking operation are satisfied, the braking control unit is adapted to select, either of the select-low control and the independent braking control in accordance with the vehicle speed in a case where the lateral acceleration is in a preset high region and then execute the selected control; select either of the select-low control and the independent braking control in accordance with the vehicle speed and the longitudinal acceleration in a case where the lateral acceleration is in a preset intermediate region, and then execute the selected control; and select and execute the select-low control in a case where the lateral acceleration is in a preset low region.

This braking force distribution control apparatus is so constituted that, for example, when the lateral acceleration is in a preset high region with a vehicle speed being low, a sufficient braking operation can be carried out by selectively executing an independent braking control, and so that, when the lateral acceleration is in the same region with a vehicle speed being high, the safety can be secured by selectively executing a select-low control. The apparatus is also so constituted that, when the lateral acceleration is in a preset intermediate region with the longitudinal acceleration being high, a judgement that a vehicle is traveling on a high friction road is given; when a vehicle speed is low, a sufficient braking operation can be carried out by executing an independent braking control; and, when a vehicle speed is high, the stability can be secured by selectively executing a select-low control. The apparatus is also so constituted that, when the longitudinal acceleration is low in this case, the stability can be secured by selectively executing a select-low control. The apparatus is formed so that, when the lateral acceleration is in a preset low region, the stability can be secured by selectively executing a select-low control.

Further, in the above braking force distribution control apparatus according to the first aspect, the select-low control and the independent braking control are carried out for the rear wheels.

Moreover, according to a second aspect of the invention, there is provided a braking force distribution control apparatus for a vehicle, including: a lateral acceleration detecting unit detecting a lateral acceleration of the vehicle; a longitudinal acceleration detecting unit detecting a longitudinal acceleration of the vehicle; and a braking control unit adapted to select and execute at least one of a select-low control, an independent braking control and a stepwise pressure increase control in accordance with the lateral acceleration and the longitudinal acceleration when preset conditions for brake operating time are satisfied, the select-low control controlling braking forces of left and right wheels depending on a wheel on the side with a large slipping condition, the independent braking control independently controlling the braking force for each wheel depending on the slipping condition of each wheel, and the stepwise pressure increase control stepwisely increasing a braking pressure to a predetermined value at the braking operation starting time.

Namely, in this braking force distribution control apparatus, the lateral acceleration of a vehicle is detected by the lateral acceleration detecting device, and the longitudinal acceleration thereof by the longitudinal acceleration detecting device. The braking control device is adapted to select one of, or to combine together such control operations in accordance with the lateral acceleration and longitudinal acceleration, when preset conditions for the brake operating time are satisfied, that include a select-low control in which a braking force for left and right wheels is controlled in accordance with a wheel on the side of a worse slipping condition, an independent braking control in which a braking force for each wheel is controlled independently in accordance with the slipping condition of each of these wheels, and a stepwise pressure increase control in which a braking pressure is stepwise increased to a value to be reached at the braking operation starting time, and execute a selected or combined control.

In addition, in the above braking force distribution control apparatus, the braking control device judges as to whether the detected lateral acceleration is in a high lateral acceleration region not lower than a predetermined value or in a low lateral acceleration region lower than the predetermined value, when the detected lateral acceleration is in the low lateral acceleration region, at least one of the select-low control, the independent braking control and the stepwise pressure increase control are selected in accordance with the lateral acceleration and the longitudinal acceleration, the selected control is then executed, and when the lateral acceleration is in the high lateral acceleration region, one of the independent braking control and a combination of the independent braking control and the stepwise pressure increase control is executed in accordance with the lateral acceleration.

When the lateral acceleration is in a low lateral acceleration region in this braking force distribution control apparatus for vehicles, the turning condition of a vehicle, the braking condition thereof and a road surface friction $\mu$ on which the vehicle travels are estimated on the basis of the lateral acceleration and longitudinal acceleration. For example, when the lateral acceleration is low with the longitudinal acceleration high, a result that the braking of the vehicle is done on a high friction road is drawn by inference, and both the front and rear wheels are subjected to an independent braking control, a reliable braking operation being thereby rendered practicable with a sufficient braking force. For example, in a case where the lateral acceleration is high with the longitudinal acceleration also high, the rear wheels and front wheels are subjected, when the possibility that the vehicle is traveling on a split friction road in an intermediate friction road can be assumed, to a select-low control and an independent control with which a stepwise pressure increase control is combined, respectively, the safety of the vehicle being thereby satisfactorily secured. For example, in a case where the lateral acceleration is low with the longitudinal acceleration also low, the rear wheels and front wheels are subjected, when the possibility that the vehicle is traveling on a split friction road in an intermediate friction road can be assumed, to a select-low control and an independent control with which a stepwise pressure increase control is combined, respectively, the safety of the vehicle being thereby satisfactorily secured. For example, when the lateral acceleration is high with the longitudinal acceleration low, a conclusion that the vehicle is turned with a gentle braking force on a high $\mu$ road or turned on an intermediate friction road is drawn by inference, and both the front and rear wheels are subjected to an independent braking control, a reliable braking operation being thereby rendered practicable with a sufficient braking force. In a case where the lateral acceleration is in a high lateral acceleration region, the turning condition of the vehicle is assumed in accordance with the lateral acceleration. For example, when the lateral acceleration is low with a conclusion that the vehicle is in a normal turning condition possible to be drawn by inference, both the front and rear wheels are subjected to an independent braking control, and a reliable braking operation can thereby be carried out with a sufficient braking force. Furthermore, when a quick turning is presumed with high lateral acceleration, the front wheels are subjected to an independent braking control while the rear wheels are subjected to an independent braking control combined with a stepwise pressure increase control to thereby suppress uncomfortable rolling impression.

Further, in the above braking force distribution control apparatus, the braking force control unit is adapted to execute the independent braking control for the front wheels, and further combine the independent braking control for the front wheels with the stepwise pressure increase control in accordance with the lateral acceleration and longitudinal acceleration. Namely, an independent braking control is carried out for the front wheels, and the reliable braking of the vehicle is thereby carried out with a sufficient braking force, while, in order to brake the vehicle with the stability thereof maintained by a combination of the lateral acceleration and longitudinal acceleration, a control of a combination of the independent braking control and a stepwise pressure increase control is carried out.

Moreover, in the above braking force distribution control apparatus, the braking control device is adapted to execute one of the select-low control and the independent braking control for the rear wheels in accordance with the lateral acceleration and longitudinal acceleration; and further combine the independent braking control for the rear wheels with the stepwise pressure increase control in accordance with the lateral acceleration and longitudinal acceleration. Namely, in order to brake the rear wheels with, for example, the stability of the vehicle maintained, a select-low control is selected, and, in order to brake the vehicle with the occurrence of unpleasant rolling behavior thereof held down, a stepwise pressure increase control is combined with the independent braking control.

BRIEF DESCRIPTION OF THE DRAWINGS

FIG. 3 is an illustration showing the condition of selection of the braking force distribution control according to the first embodiment;

FIG. 5 is a diagram illustrating the condition of the selection of the braking force distribution control according to the second embodiment.

DETAILED DESCRIPTION OF THE PREFERRED EMBODIMENTS

Figure 1:
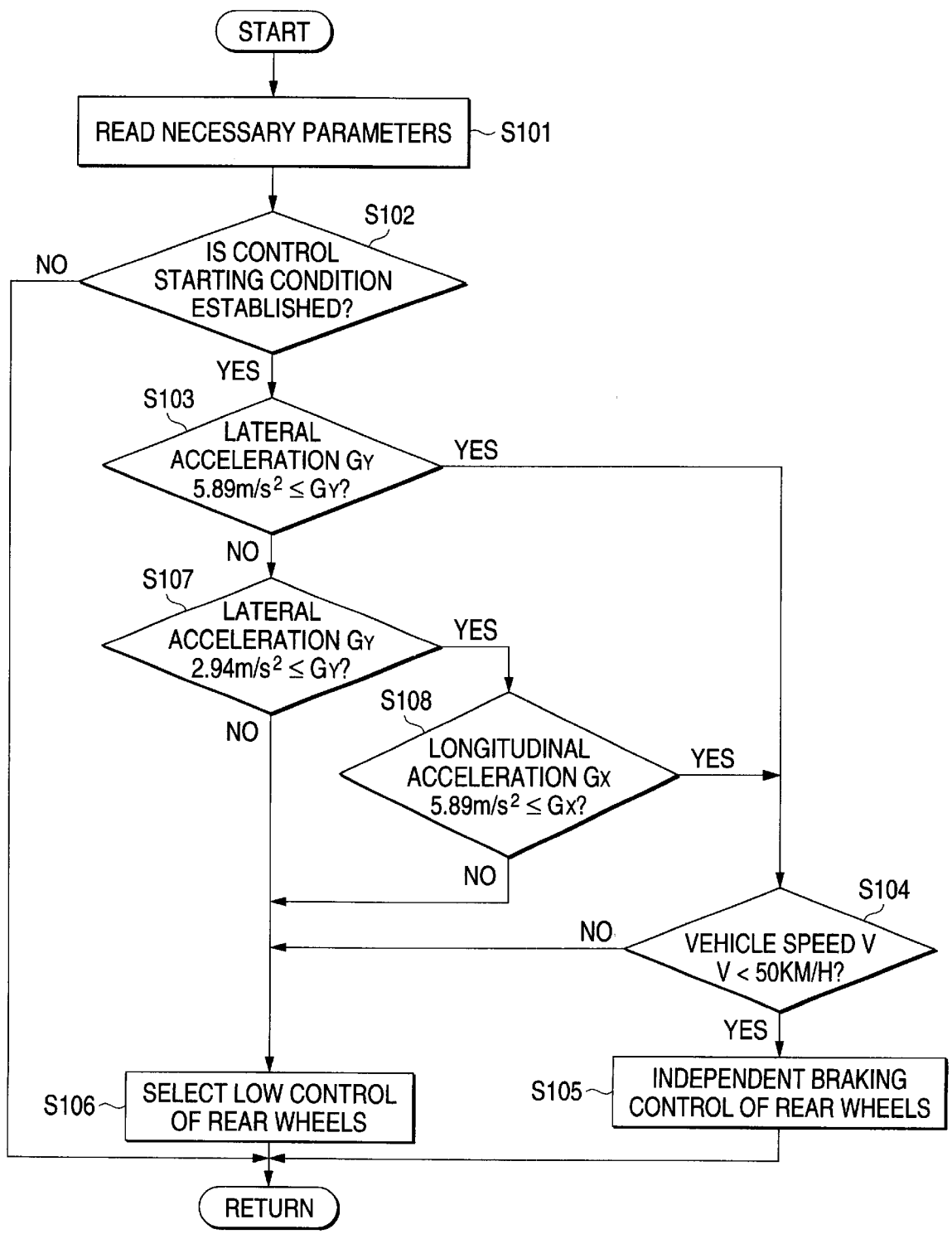
FIG. 1 is a flowchart of a braking force distribution control according to a first embodiment of the present invention.
Figure 2:
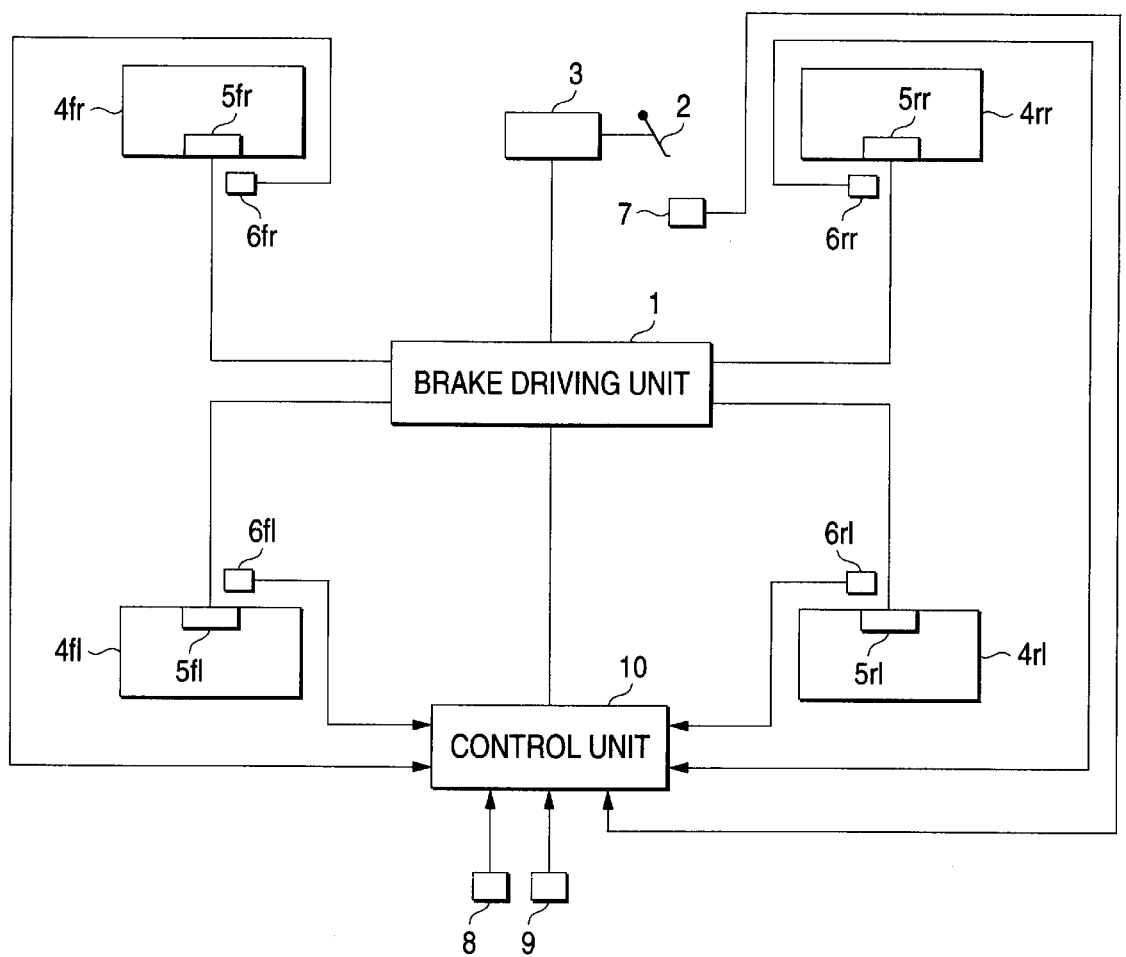
FIG. 2 is a schematic illustration of a braking force distribution control apparatus as a whole.

Preferred embodiments of the present invention will be explained below on the basis of the drawings. FIGS. 1 to 3 shows a first embodiment of the present invention.

In FIG. 2, the reference numeral 1 denotes a brake driving unit. The brake driving unit 1 is connected to a master cylinder 3 which is connected to a brake pedal 2 operated by a driver. With the driver operating the brake pedal 2, the master cylinder 3 introduces braking pressures through the above-described brake driving unit 1 to respective wheel cylinders (a left front wheel cylinder 5fl, a right front wheel cylinder 5fr, a left rear wheel cylinder 5rl, and a right rear wheel cylinder 5rr) of four wheels (a left front wheel 4fl, a right front wheel 4fr, a left rear wheel 4rl, and a right rear wheel 4rr), by which brakes are applied to the four wheels.

The brake driving unit 1 is a hydraulic unit provided with a hydraulic pump, a pressure reducing valve, a pressure increasing valve, an oil pump, and etc. The brake driving unit 1 is composed so as to freely introduce the braking pressure independently to each of the wheel cylinders 5fl, 5fr, 5rl, and 5rr in response to input signals from a control unit 10 described later.

The respective wheels 4fl, 4fr, 4rl, and 4rr are constructed so as to have their wheel speed detected by respective wheel speed sensors (a left front wheel speed sensor 6fl, a right front wheel speed sensor 6fr, a left rear wheel speed sensor 6rl, and a right rear wheel speed sensor 6rr). In the first embodiment, a vehicle speed V is to be obtained by calculating an average of the wheel speeds. Namely, the wheel speed sensors 6fl, 6fr, 6rl, 6rr are provided as devices for detecting the vehicle speed V.

To the control unit 10, there are connected the wheel speed sensors 6fl, 6fr, 6rl, and 6rr, a brake switch 7 for detecting ON and OFF of the brake pedal 2, a lateral acceleration sensor 8 as a lateral acceleration detecting unit detecting the lateral acceleration Gy of the vehicle, and a longitudinal acceleration sensor 9 as a longitudinal acceleration detecting unit detecting longitudinal acceleration Gx of the vehicle.

The control unit 10 is formed with a micro computer and auxiliary control circuits and, when the brake pedal 2 is stepped on to be made ON (when the brake switch 7 is made ON), executes ABS control or braking force distribution control in response to the respective input signals so as to output a control signal to the brake driving unit 1 for carrying out braking control of the vehicle.

The ABS control is performed by known control method, which performs calculations on a speed, an acceleration and a deceleration of each wheel, and a simulatively calculated vehicle body speed (a value calculated by making a decision when suddenly a brake pedal 2 is stepped on and a deceleration of the wheel speed is above a specified value, by setting the wheel speed at the time of the decision as an initial value, and by reducing thereafter the wheel speed therefrom with a specified deceleration) and the like. By judging from a comparison of the simulatively calculated vehicle body speed and the wheel speed, a magnitude of the acceleration or deceleration of the wheel, one of three oil pressure modes of a pressure increase, a pressure hold, and a pressure reduction is selected when the ABS is operated. The selected specified braking control signal is outputted to the brake driving unit 1.

The braking force distribution control is executed in accordance with the procedure of a braking force distribution control which will be described hereafter. When preset control starting conditions for the brake operating are established, either a select-low control which controls braking forces for left and right rear wheels in accordance with a wheel on the side with a large slipping condition on the basis of lateral acceleration Gy, longitudinal acceleration Gx and a vehicle speed V, or an independent braking control which independently controls the braking forces for the left and right rear wheels depending on the slipping condition of each of these wheels, is selected, and then executed. Namely, the control unit 10 is formed with a function as a braking control unit.

Next, a braking force distribution control will be described on the basis of a flowchart of FIG. 1. A program of this braking force distribution control is executed repeatedly at predetermined time intervals. First, in Step (which will hereinafter be abbreviated to "S") 101, parameters necessary for the braking force distribution control, i.e. a brake operating signal from the brake switch 7, a signal representative of information on whether an ABS control is being carried out or not, respective wheel speeds from the wheel speed sensors 6fl, 6fr, 6rl, 6rr and a vehicle speed computed on the basis of these wheel speeds, a lateral acceleration Gy from the lateral acceleration sensor 8 and a longitudinal acceleration Gx from the longitudinal acceleration sensor 9, etc. are read.

The execution then goes to S102, and a judgement as to whether the preset control starting conditions are established or not is made. The control starting conditions are set, for example, as follows.

When a brake operating signal is on and the vehicle is in a turning condition, a judgement that the control starting conditions are established is given if the following conditions are satisfied: a difference between speeds of the front wheels and rear wheels is not lower than a preset value; the vehicle deceleration based on the longitudinal acceleration Gx is not lower than a preset value (for example, 3.92 m/s$^2$); a vehicle speed V is higher than 30 km/h; two rear wheels 4rl, 4rr are subjected to a non-ABS control; and two front wheels 4fl, 4fr are subjected to a non-ABS control.

When a brake operating signal is on and the vehicle is in a non-turning condition (i.e. in a straightly running condition), a judgement that the control starting conditions are established is given if the following conditions are satisfied: a difference between speeds of the front and rear wheels is not lower than a preset value (higher than that attainable when the vehicle is in a turning condition); the vehicle deceleration based on the longitudinal acceleration Gx is not lower than a preset value (for example, 7.84 m/s$^2$) a vehicle speed V is higher than 30 km/h; two rear wheels 4rl, 4rr are subjected to a non-ABS control; and two front wheels 4fl, 4fr are subjected to a non-ABS control.

The judgement of the turning and non-turning condition of a vehicle which is used in the braking force distribution control starting conditions is made on the basis of, for example, the lateral acceleration Gy and longitudinal acceleration Gx. A judgement that the vehicle is in a turning condition is made when the vehicle deceleration based on the longitudinal acceleration Gx is not higher than 5.89 m/s$^2$ with the lateral acceleration Cy not lower than 2.94 m/s$^2$, and when the vehicle deceleration based on the longitudinal acceleration Gx is higher than 5.89 m/s$^2$ with the lateral acceleration Gy not lower than 5.89 m/s$^2$. A judgement that the vehicle is in a non-turning condition is made when the lateral acceleration and longitudinal acceleration are at other levels than the above-mentioned levels.

When the above control starting conditions are established, the execution goes to S103, and, when the control starting conditions are not established, the execution goes out of a program.

When the execution goes to S103 after the control starting conditions are established, the judging of the lateral acceleration Gy is further done for the selection of a select-low control and an independent braking control. When a judgement that the lateral acceleration Gy is not lower than a preset value (for example, 5.89 m/s$^2$) is made, the execution goes to S104.

In S104, the judging of the vehicle speed V is done. When the vehicle speed V is lower than, for example, 50 km/h, a fine judgement that the vehicle is in a turning condition is made again. The execution goes to S105, and the rear wheels are subjected to an independent braking control so as to secure a braking force for a turning outside wheel, whereby a sufficient braking force is obtained at the rear wheels.

In the independent braking control for the rear wheels in S105, a pressure reduction control, a pressure holding control and a pressure increase control for a braking pressure are carried out independently, for example, in accordance with a speed difference between high-speed front wheels and respective rear wheels. To be exact, when a speed difference between the front and rear wheels becomes not lower than a preset pressure reduction threshold value, the pressure reduction control is carried out. When a speed difference between the front and rear wheels becomes not lower than a preset pressure holding threshold value, the pressure holding control is carried out. When a speed difference between the front and rear wheels becomes lower than a preset pressure increase threshold value, a pressure increase control is carried out.

When the results of the judgement of the vehicle speed V in S104 shows that the vehicle speed V is, for example, not lower than 50 km/h, the execution goes to S106, and the rear wheels are subjected to a select-low control to secure the stability of vehicle in order to prevent an unpleasant rolling behavior that will be caused when a turning outside wheel is independently controlled.

In the select-low control for the rear wheels in S106, braking pressure reduction, holding and increase controls are carried out in accordance with a speed difference between, for example, the high-speed front wheels and a lower-speed rear wheel out of the left and right rear wheels. The pressure reduction, holding and increase controls are carried out in accordance with the speed difference between the high-speed front wheels and a lower-speed rear wheel out of the left and right rear wheels in the same manner as the above-described independent braking control.

When the lateral acceleration Gy is judged to be lower than a preset value (for example, 5.89 m/s$^2$) in S103, the execution goes to S107, in which the lateral acceleration Gy is judged as to whether it is higher than a preset value (for example, 2.94 m/s$^2$) or not.

When the lateral acceleration Gy is judged to be higher than 2.94 m/s$^2$ in S107, i.e., 2.94 m/s$^2$<Gy<5.89 m/s$^2$ which is an intermediate region, the execution goes to S108. When the lateral acceleration Gy is judged to be not higher than 2.94 m/s$^2$ which is a lower region, a judgement that the vehicle is braked while traveling straight is given, and the execution goes to S106, in which the rear wheels are subjected to a select-low control so as to secure the stability.

When the execution goes to S108 after a judgement that the lateral acceleration Gy is in the intermediate region is given in S107, the longitudinal acceleration Gx is compared with a preset value (for example, 5.89 m/s$^2$). When the longitudinal acceleration Gx is not lower than 5.89 m/s$^2$ which is a deceleration more than a normal level, a judgement that the vehicle is braked on a high friction road is given, and the execution goes to S104.

On the contrary, when the longitudinal acceleration Gx is lower than 5.89 m/s$^2$ and the deceleration is low in S108, there is the possibility that the vehicle is braked on a pressed snow road and the like. Therefore, in order to secure the stability, the execution goes to S106, so that the rear wheels are subjected to a select-low control.

The selection of the above-mentioned braking force distribution controls are shown in FIG. 3 with respect to the regions of the lateral acceleration Gy and longitudinal acceleration Gx. Namely, when the lateral acceleration Gy is in a low region of not higher than 2.94 m/s$^2$, the rear wheels are subjected to a select-low control irrespective of the longitudinal acceleration Gx. Where the lateral acceleration Gy is higher than 2.94 m/s$^2$ and lower than 5.89 m/s$^2$, i.e., in an intermediate region, the rear wheels are subjected to a select-low control when the longitudinal acceleration Gx is lower than 5.89 m/s$^2$, and to such a control, when the longitudinal acceleration Gx is not lower than 5.89 m/s$^2$, that is selected from a select-low control and an independent braking control in accordance with a vehicle speed V. When the lateral acceleration Gy is not lower than 5.89 m/s$^2$, a control selected from a select-low control and an independent braking control is carried out in accordance with a vehicle speed V irrespective of the longitudinal acceleration Gx.

According to the first embodiment of the present invention, it becomes possible that a rear wheel control is executed by selecting from a select-low control and an independent braking control in accordance with the lateral acceleration Gy, the longitudinal acceleration Gx of a vehicle and the vehicle speed. This enables to obtain the stability and a sufficient braking performance in a well-balanced manner in accordance with the traveling condition of the vehicle and a traveling environment. The brake driving unit 1 may be formed of a unit capable of carrying out a related art ABS control, which can be attained easily by changing a control of the control unit 10.

Figure 4:
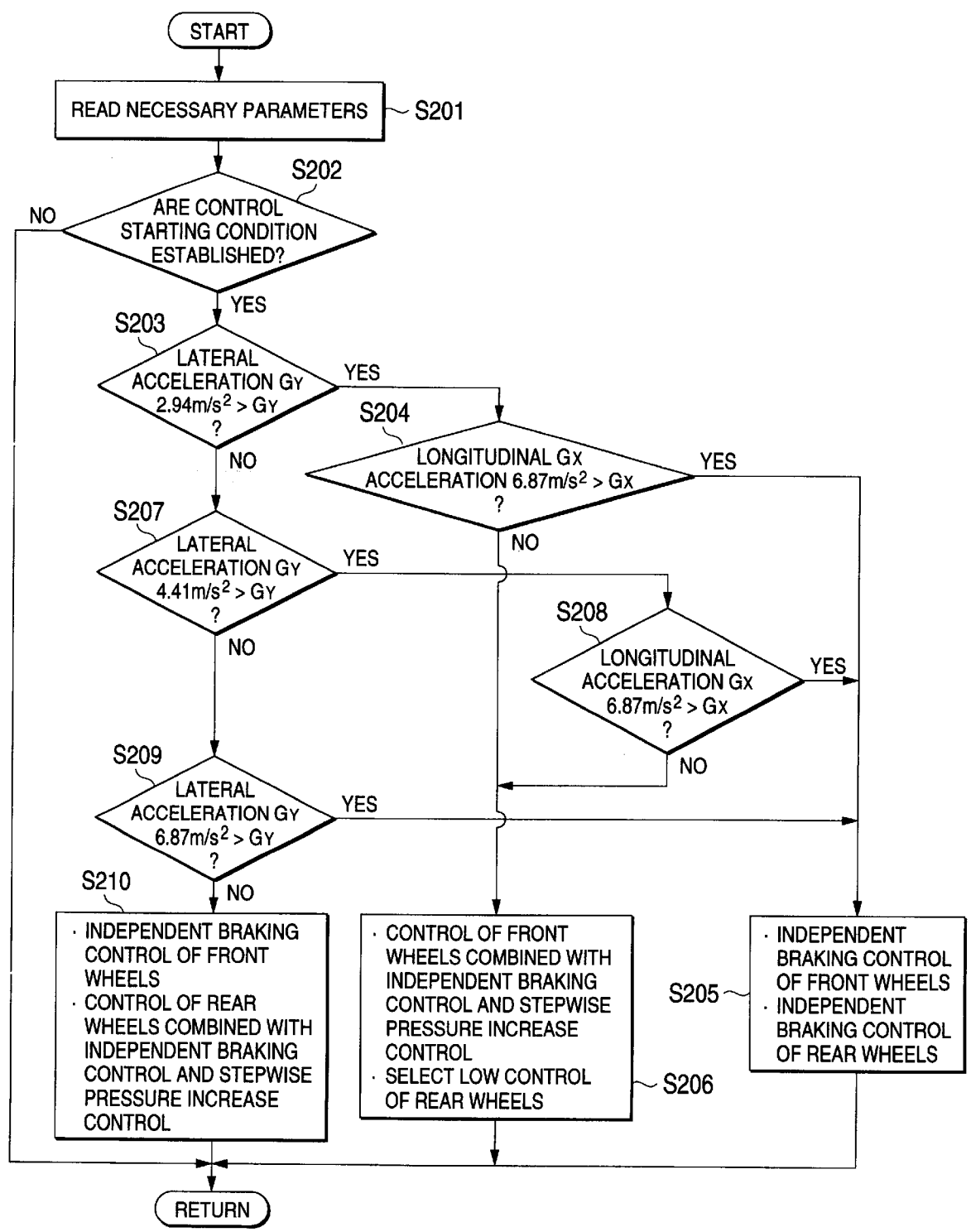
FIG. 4 is a flowchart of a braking force distribution control according to a second embodiment of the present invention.

Next, a description will be given of a second embodiment of the present invention with reference to FIGS. 4 and 5.

The second embodiment is different in braking force distribution control from the first embodiment, and a braking force distribution control apparatus is basically identical to that of the first embodiment shown in FIG. 2.

The braking force distribution control according to the second embodiment is carried out in accordance with the procedure, which will be described later. When preset conditions for the brake operating time are satisfied, a select-low control for controlling braking forces for left and right wheels in accordance with to a wheel on the side of a large slipping condition, independent braking control for independently controlling a braking force for each wheel in accordance with the slipping condition of each of these wheels, and stepwise pressure increase control for stepwise increasing a braking pressure up to a braking pressure to be reached at the control operation starting time are subjected to selection or combined in accordance with the lateral acceleration Gy and longitudinal acceleration Gx, and a selected or a combined control is executed.

Next, a braking force distribution control will be described on the basis of a flowchart of FIG. 4. A program of this braking force distribution control is executed repeatedly at predetermined time intervals. First, in S201, parameters necessary for the braking force distribution control are read.

The execution then goes to S202, and a judgement as to whether the preset control starting conditions are established or not is made. The parameters necessary for the braking force distribution control in S201, and the braking force distribution control starting conditions in S202 are identical to that of the first embodiment.

When the control starting conditions are established, the execution goes to S203. And, when the control starting conditions are not established, the execution goes out of a program.

When the execution goes to S103 after the control starting conditions are established, the judging of the lateral acceleration Gy is further done. When a judgement that the lateral acceleration Gy is lower than a preset value (for example, 2.94 m/s$^2$) is made, the execution goes to S204.

In S204, the judgement on the longitudinal acceleration Gx is made. When the longitudinal acceleration Gx is as high as, for example, not lower than 6.87 m/s$^2$, an assumption that the vehicle is braked on a high friction road is obtained, and the execution goes to S205, so that both the front wheels and rear wheels are subjected to the independent braking control so as to secure a sufficient braking force.

In the independent braking control for the rear wheels (front wheels) in S205, reduction, holding and increase controls for the braking pressure are carried out independently in accordance with a speed difference between, for example, high-speed front wheels (rear wheels) and respective rear wheels (respective front wheels). To be exact, when a speed difference between the front and rear wheels becomes not lower than a preset pressure reduction threshold value, a pressure reduction control is carried out. When a speed difference between the front and rear wheels becomes higher than a preset pressure holding threshold value, a pressure holding control is carried out. When a speed difference between the front and rear wheels becomes lower than a preset pressure increase threshold value, a pressure increase operation is carried out.

Due to the results of the judgement of the longitudinal acceleration Gx made in S204, when the longitudinal acceleration Gx is low, i.e., lower than 6.87 m/s$^2$, the possibility that the vehicle is traveling on a split friction road in an intermediate friction road can be assumed. Therefore, the execution goes to S206. In S206, the front wheels are subjected to independent braking control with which stepwise pressure increase control is combined, and the rear wheels to the select-low control, this enabling the safety of the vehicle to be sufficiently secured.

The stepwise pressure increase control is a known control operation in which a braking pressure is increased stepwise by repeating fine pressure increasing and holding operations at only the control starting time until the braking pressure reaches a value of a predetermined braking pressure. For example, a sudden increase in a hydraulic pressure supplied to an actuator does not occur in an initial period of a braking operation for a wheel of a lower slipping ratio on a split friction road, and the control operation is thereby carried out while the occurrence of a yawing moment is restrained.

In the select-low control for the rear wheels, pressure reduction, holding and increasing controls for the braking pressure of the right and left rear wheels are conducted in accordance with a speed difference between, for example, high-speed front wheels and a lower-speed wheel out of the left and right rear wheels. The pressure reduction, pressure holding and pressure increasing controls are carried out in accordance with a speed difference between the high-speed front wheels and a lower-speed wheel out of the left and right rear wheels by the same method as the above-described independent braking control.

On the contrary, when a judgement that the lateral acceleration Gy is not lower than 2.94 m/s$^2$ is given in S103, the execution goes to S207 so as to judge whether the lateral acceleration Gy is lower than a preset value (for example, 4.41 m/s$^2$) or not.

When the judgement that the lateral acceleration Gy is lower than 4.41 m/s$^2$ is given in S207, i.e., when a judgement that the lateral acceleration Gy is 2.94 m/s$^2 \leq$ Gy<4.41 m/s$^2$ which is a large range in a low lateral acceleration region is given, the execution goes to S208.

In S208, the longitudinal acceleration Gx is compared with a preset value, for example, 6.87 m/s$^2$. When the longitudinal acceleration Gx is lower than 6.87 m/s$^2$, the possibility of either the turning of the vehicle with a gentle braking force on a high friction road or the turning of the vehicle on an intermediate friction road can be assumed. Therefore, the execution goes to S205, so that both the front and rear wheels are subjected to the independent braking control so as to secure a sufficient braking force.

As the results of the comparison made in S208, when the longitudinal acceleration Gx is not lower than 6.87 m/s$^2$, the possibility that the vehicle is traveling on a split friction road in an intermediate friction road can be assumed, so that the execution goes to S206. In S206, the front wheels are subjected to the independent braking control with which the stepwise pressure increase control is combined, and the rear wheels are subjected to the select-low control, this enabling the safety of the vehicle to be satisfactorily secured.

When a judgement that the lateral acceleration Gy is not lower than 4.41 m/s$^2$ is then given in S207, the execution goes to S209, in which the lateral acceleration Gy is judged as to whether it is lower than a preset value (for example, 6.87 m/s$^2$) or not.

When a judgement that the lateral acceleration Gy is lower than 6.87 m/s$^2$ is given in S209, i.e., when a judgement that the lateral acceleration Gy is 4.41 m/s$^2 \leq$ Gy<6.87 m/s$^2$, which is a small range in a large lateral acceleration region, an assumption that the vehicle is turned normally is made, and the execution goes to S205, in which both the front and rear wheels are subjected to the independent braking control.

When a judgement that the lateral acceleration Gy is not lower that 6.87 m/s$^2$ is given in S209, i.e., when a judgement that the lateral acceleration Gy is in a large range in a high lateral acceleration region is given, an assumption that the vehicle is turned with a high lateral acceleration is obtained, and the execution goes to S210. The front wheels are then subjected to the independent braking control, and the rear wheels are subjected to the independent braking control with which the stepwise pressure increasing control is combined. A sudden increase in the braking force for, especially, the turning outside wheel with a large vertical load is thereby restrained, and the occurrence of unpleasant rolling behavior is reduced.

The selection of the above braking force distribution controls is shown in FIG. 5 with respect to the regions of the lateral acceleration Gy and longitudinal acceleration Gx. In a case where the lateral acceleration Gy is in a small range in a low lateral acceleration region of lower than 2.94 m/s$^2$, both the front and rear wheels are subjected to the independent braking control when the longitudinal acceleration Gx is as high as not lower than 6.87 m/s. When the longitudinal acceleration Gx is low, i.e., lower than 6.87 m/s$^2$, the front wheels are subjected to the independent braking control with which the stepwise pressure increase control is combined, and the rear wheels are subjected to the select-low control.

In a case where the lateral acceleration Gy is in a large range in a low lateral acceleration region of 2.94 m/s$^2$≦Gy<4.41 m/s$^2$, the front wheels are subjected to the independent braking control with which the stepwise pressure increase control is combined, and the rear wheels are subjected to the select-low control when the longitudinal acceleration Gx is high, i.e., not lower than 6.87 m/s$^2$. When the longitudinal acceleration Gx is low, i.e., lower than 6.87 m/s$^2$, both the front and rear wheels are subjected to the independent braking control.

When the lateral acceleration Gy is in a small range in a high lateral acceleration region of 4.41 m/s$^2$≦Gy<6.87 m/s$^2$, both the front and rear wheels are subjected to the independent braking control irrespective of the longitudinal acceleration Gx.

When the lateral acceleration Gy is in a large range in a high lateral acceleration region of not lower than 6.87 m/s$^2$, the front wheels are subjected to the independent braking control, and the rear wheels are subjected to the independent braking control with which the stepwise pressure increase control is combined, irrespective of the longitudinal acceleration Gx.

Thus, according to the second embodiment of the present invention, a braking force distribution control is carried out by selecting for front wheels either of an independent braking control and the independent braking control with which the stepwise pressure increase control is combined, in accordance with the lateral acceleration Gy and longitudinal acceleration Gx of a vehicle, and, for rear wheels, one of the independent braking control and the independent braking control with which the stepwise pressure increase control is combined, and the select-low control. This enables the stability and a satisfactory braking performance to be obtained in an accurate well-balanced manner in accordance with the traveling conditions and environments of the vehicle.

As described the above, according to the first aspect of the present invention, either a select-low control which controls the braking forces for a left wheel and a right wheel in accordance with lateral acceleration, longitudinal acceleration and a vehicle speed correspondingly to a wheel on the side with a large slipping condition, or an independent braking control which controls the braking force for each wheel in accordance with the slipping condition of each of these wheels is selected when preset conditions for brake operating time are satisfied, and then a selected control is executed. This enables either of the independent braking control and select-low control to be selected and executed in accordance with the variously changing traveling condition of the vehicle without additionally providing a special complicated mechanism, and a reliable and stable braking operation to be carried out in a well-balanced manner.

In addition, according to the second aspect of the invention, the braking control device is adapted to select one of or combine together such controls in accordance with the lateral acceleration and longitudinal acceleration, when preset conditions for the brake operating time are satisfied, that include the select-low control which controls a braking force for left and right wheels in accordance with a wheel on the side of a large slipping condition, the independent braking control which independently controls a braking force for each wheel in accordance with the slipping condition of each of these wheels, and a stepwise pressure increase control in which a braking pressure is increased stepwise to a value to be reached at the braking operation starting time, and execute the selected or combined control. This also enables various braking controls to be selected suitably in accordance with variously changing traveling condition of a vehicle, and a selected control to be executed, without adding a special complicated mechanism to the apparatus. Therefore, a reliable and stable braking operation can be carried out finely and in a well-balanced manner.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A braking force distribution control apparatus for a vehicle, comprising:
    a lateral acceleration detecting unit detecting a lateral acceleration of the vehicle;
    a longitudinal acceleration detecting unit detecting a longitudinal acceleration of the vehicle;
    a vehicle speed detecting unit detecting a vehicle speed; and
    a braking control unit adapted to select and execute, one of a select-low control and an independent braking control in accordance with the lateral acceleration, the longitudinal acceleration and the vehicle speed when preset conditions for brake operating time are satisfied,
    said select-low control controlling braking forces of left and right wheels depending on a wheel on the side with a large slipping condition,
    said independent braking control independently controlling the braking force for each wheel depending on the slipping condition of each wheel and when the lateral acceleration is in a range lower than a predetermined value, said select-low control and said independent braking control are switched on the basis of at least one of longitudinal acceleration and vehicle speed.

2. The braking force distribution control apparatus according to claim 1, wherein said braking control unit is adapted to select and execute one of said select-low control and said independent braking control in accordance with the vehicle speed in a case where the lateral acceleration is in a preset high region, when the preset conditions for braking operating time are satisfied; select and execute one of said select-low control and said independent braking control in accordance with the vehicle speed and the longitudinal acceleration when the lateral acceleration is in a preset intermediate region; and select and execute said select-low control in a case where the lateral acceleration is in a preset low region.

3. The braking force distribution control apparatus according to claim 1, wherein said select-low control and said independent braking control are carried out for the rear wheels.

4. A braking force distribution control apparatus for a vehicle, comprising:
   a lateral acceleration detecting unit detecting a lateral acceleration of the vehicle;
   a longitudinal acceleration detecting unit detecting a longitudinal acceleration of the vehicle; and
   a braking control unit adapted to select and execute at least one of a select-low control, an independent braking control and a stepwise pressure increase control in accordance with the lateral acceleration and the longitudinal acceleration when preset conditions for brake operating time are satisfied,
   said select-low control controlling braking forces of left and right wheels depending on a wheel on the side with a large slipping condition,
   said independent braking control independently controlling the braking force for each wheel depending on the slipping condition of each wheel, and
   said stepwise pressure increase control stepwisely increasing a braking pressure to a predetermined value at the braking operation starting time and said independent braking control, the combination of said independent braking control and said stepwise pressure increase control, and said select-low control are switched for a front wheel and a rear wheel on the basis of the lateral acceleration and the longitudinal acceleration.

5. The braking force distribution control apparatus according to claim 4, wherein said braking control unit judges as to whether the detected lateral acceleration is in a high lateral acceleration region higher than a predetermined acceleration value or in a low lateral acceleration region lower than the predetermined value,
   wherein at least one of said select-low control, said independent braking control and said stepwise pressure increase control is selected and executed in accordance with the lateral acceleration and the longitudinal acceleration when the detected lateral acceleration is in the low lateral acceleration region, and
   wherein one of said independent braking control and a combination of said independent braking control and said stepwise pressure increase control is executed in accordance with the lateral acceleration when the lateral acceleration is in the high lateral acceleration region.

6. The braking force distribution control apparatus according to claim 4, wherein said braking force control unit is adapted to execute the independent braking control for the front wheels, and further combine said independent braking control for the front wheels with said stepwise pressure increase control in accordance with the lateral acceleration and longitudinal acceleration.

7. The braking force distribution control apparatus according to claim 4, wherein said braking control unit is adapted to execute one of said select-low control and said independent braking control for the rear wheels in accordance with the lateral acceleration and longitudinal acceleration; and further combine said independent braking control for the rear wheels with said stepwise pressure increase control in accordance with the lateral acceleration and longitudinal acceleration.

8. A braking force distribution control method for a vehicle:
   detecting a lateral acceleration of the vehicle;
   detecting a longitudinal acceleration of the vehicle;
   detecting a vehicle speed; and
   controlling braking forces of wheels by selecting and executing, one of a select-low control and an independent braking control in accordance with the lateral acceleration, the longitudinal acceleration and the vehicle speed when preset conditions for brake operating time are satisfied,
   said select-low control controlling the braking forces of left and right wheels depending on a wheel on the side with a large slipping condition,
   said independent braking control independently controlling the braking force for each wheel depending on the slipping condition of each wheel and when the lateral acceleration is in a range lower than the predetermined value, switching said select low control and said independent braking control on the basis at least one of longitudinal acceleration and vehicle speed.

9. The braking force distribution control method according to claim 8, wherein said controlling step selects and executes one of said select-low control and said independent braking control in accordance with the vehicle speed in a case where the lateral acceleration is in a preset high region, when the preset conditions for braking operating time are satisfied; selects and executes one of said select-low control and said independent braking control in accordance with the vehicle speed and the longitudinal acceleration when the lateral acceleration is in a preset intermediate region; and selects and executes said select-low control in a case where the lateral acceleration is in a preset low region.

10. The braking force distribution control method according to claim 8, wherein said select-low control and said independent braking control are carried out for the rear wheels.

11. A braking force distribution control method for a vehicle, comprising:
    detecting a lateral acceleration of the vehicle;
    detecting a longitudinal acceleration of the vehicle; and
    controlling braking forces of wheels by selecting and executing at least one of a select-low control, an independent braking control and a stepwise pressure increase control in accordance with the lateral acceleration and the longitudinal acceleration when preset conditions for brake operating time are satisfied,
    said select-low control controlling the braking forces of left and right wheels depending on a wheel on the side with a large slipping condition,
    said independent braking control independently controlling the braking force for each wheel depending on the slipping condition of each wheel, and
    said stepwise pressure increase control stepwisely increasing a braking pressure to a predetermined value at the braking operation starting time and switching said independent braking control, the combination of said independent braking control and said stepwise pressure increase control, and said select low control for a front wheel and rear wheel on the basis of the lateral acceleration and the longitudinal acceleration.

12. The braking force distribution control method according to claim 11, wherein said controlling step judges as to whether the detected lateral acceleration is in a high lateral acceleration region higher than a predetermined acceleration value or in a low lateral acceleration region lower than the predetermined value, wherein at least one of said select-low control, said independent braking control and said stepwise pressure increase control is selected and executed in accordance with the lateral acceleration and the longitudinal acceleration when the detected lateral acceleration is in the low lateral acceleration region, and wherein one of said independent braking control and a combination of said independent braking control and said stepwise pressure increase control is executed in accordance with the lateral acceleration when the lateral acceleration is in the high lateral acceleration region.

13. The braking force distribution control method according to claim 11, wherein said controlling step executes the independent braking control for the front wheels, and further combines said independent braking control for the front wheels with said stepwise pressure increase control in accordance with the lateral acceleration and longitudinal acceleration.

14. The braking force distribution control method according to claim 11, wherein said controlling step executes one of said select-low control and said independent braking control for the rear wheels in accordance with the lateral acceleration and longitudinal acceleration; and further combines said independent braking control for the rear wheels with said stepwise pressure increase control in accordance with the lateral acceleration and longitudinal acceleration.

* * * * *